May 16, 1950           H. CHORLTON           2,507,961
REVERSIBLE ADJUSTABLE CHECKING GAUGE
Filed April 29, 1944
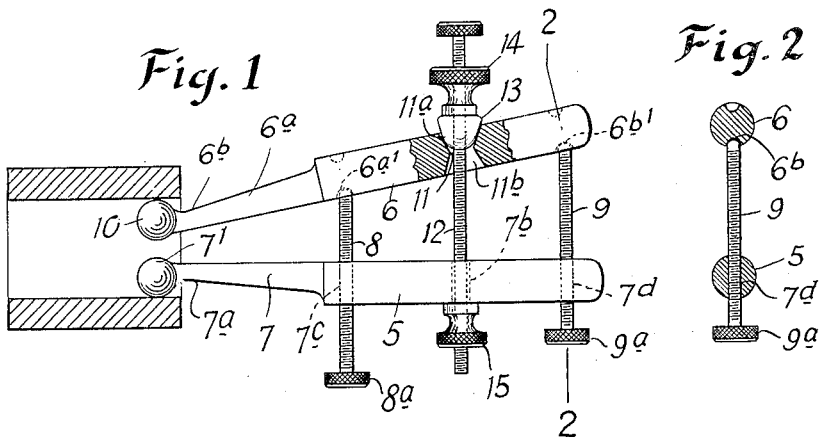
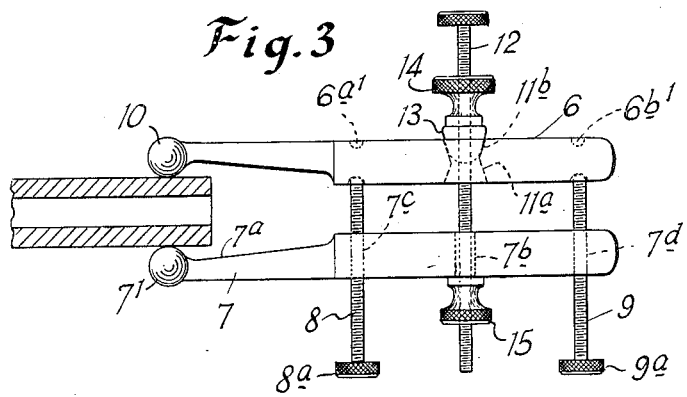
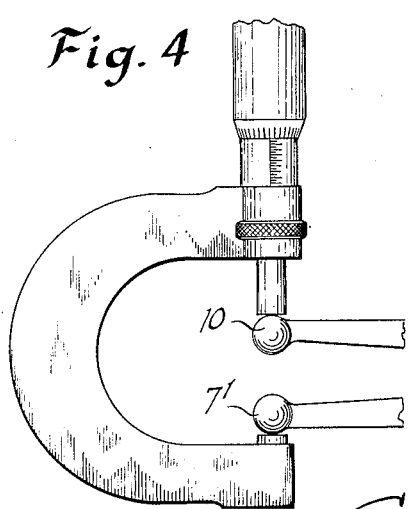
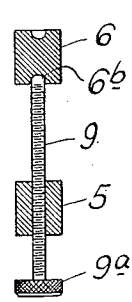
INVENTOR
Herbert Chorlton
BY
Carl Miller
ATTORNEY Patented May 16, 1950

2,507,961

UNITED STATES PATENT OFFICE 2,507,961

REVERSIBLE ADJUSTABLE CHECKING GAUGE

Herbert Chorlton, Huntington, N. Y.

Application April 29, 1944, Serial No. 533,287

7 Claims. (Cl. 33—163)

This invention relates to an improved gauge for checking or testing internal or external surfaces, and one of its objects is to provide a device consisting of a pair of cooperating arms, each of which is formed with a spherical feeler head or terminal, the head of each arm being offset on the reduced forward arm of the member, whereby the two arms may be positioned for shop testing or checking of internal surfaces, or reversed for shop checking or testing of external surfaces, for the purposes of determining the correctness of internal and external diameters.

Another object of the invention is the provision of a diameter checking tool or device with companion checking bars, each having a contact terminal, two screw threaded rods for regulating the spacing between the bars, a third bar for adjusting the distance between the companion bars, and means carried by the third bar for engaging a suitable bearing formed in one of the companion bars, whereby the companion bars may be arranged in parallel relation to each other, or in non-parallel relation, and the third bar, which is placed intermediate of the two first bars, may be tightly adjusted, to rigidly clamp the companion checking bars in any selected position.

Another object of the invention is the provision of a checking device with a main adjusting bar for adjusting the distance between the two bars used for checking distances or diameters, and independent adjustable bars for adjusting one of the checking bars or members, whereby the two checking bars or members may be rigidly locked in any adjusted position, against the tension of the main adjusting bar, and the two checking bars or members may be arranged in any required relation to each other, so as to permit of desirable relations between the feeler terminals of the checking bars or members.

With the above and other objects in view the invention consists in certain new and useful constructions, combinations and arrangements of parts, fully described in the following specification, and clearly illustrated in the accompanying drawings, in which:

Fig. 1 is a side view, shown partly in elevation and partly in longitudinal section.

Fig. 2 is a transverse sectional view thereof, taken on line 2—2 of Fig. 1.

Fig. 3 is a side view showing the companion arms in a different adjusted relation to that shown in Fig. 1, an object to be measured being shown in section.

Fig. 4 is a view, partly broken away, in side elevation, showing the manner that the spherical terminals of the checking arms or bars are checked by a standard micrometer for accuracy.

Fig. 5 is a detail sectional view of a modified construction.

Referring to the accompanying drawings, which illustrate a practical embodiment of my invention, 5 designates one of the companion checking bars or members, and 6 the other cooperating bar or member. The bar or member 5 is formed with parallel sides, and may be constructed in a cylindrical form, as shown in Fig. 2, or in a rectangular form, as shown in Fig. 5, both in cross section.

The bar 5 is further formed with a finger or extension 7, which extends from one end of the bar, and terminates in a feeler or contact ball or spherical member 7'. This feeler or contact ball is slightly offset from the longitudinal axis of the bar 5, and one side of the finger or extension 7 is relieved at 7a, to provide clearance for checking internal surfaces and diameters.

The bar 5 is also formed with three transverse holes or openings 7b, 7c and 7d, spaced longitudinally from each other. The opening or hole 7b is not internally screw threaded, but the openings or holes 7c and 7d are internally screw threaded. A screw 8 is threaded through the opening 7c and is provided with a knurled or other form of hand manipulated head 8a. A screw 9 is threaded through the opening 7d and this is provided with a similar head 9a.

The bar 6 has the same general profile or form as the bar 5, and is constructed with an end finger or extension 6a, having a terminal feeler ball or spherical member 10. One side of the finger or extension 6a is offset at 6b to provide a clearance for internal checking, as illustrated in Fig. 1.

The bar 6 is formed with an opening 11, located midway of the ends of the bar, which extends through the bar, and the wall of this opening or hole is formed with a conical seat 11a, opening through one side of the bar, and another conical seat 11b, opening through the other side of the bar. The bar 6 is also formed with semispherical recesses 6a' and 6b', positioned in line with the screws 8 and 9, so that the rounded ends of these screws may have pressure bearing in the recesses 6a' and 6b'. The bar 6 is also formed with a duplicate set of such recesses 6a' and 6b', located on the opposite side of the bar, to permit the bar to be reversed from the position shown in Fig. 1 to the position shown in Fig. 3.

A screw 12 is extended through the opening 11 of the bar 6, and is provided with a ball end washer 13, which engages the outer conical seat of the bar 6, as shown in Fig. 1. The other end of the screw 12 is extended, but not threaded, through the opening 7b of the bar 5. A knurled nut 14 is threaded on the screw 12 to engage the outer end of the ball end washer 13, and a knurled nut 15 is threaded on the screw 12 to engage the outer side of the bar 5.

The construction shown permits of the arrangement of the companion bars 5 and 6 in various angular positions, in order to bring the opposite terminal feeler balls in the desired relation for contacting the internal surfaces of a tube or other hollow body, or contacting the outer surfaces of any shaped body.

The ball end washer and its engaged conical seat permits of the tilting of the bar 6 with reference to the bar 5, so that various angular relations, or a parallel relation between the two bars, may be established and maintained, as illustrated in Figs. 1 and 3. The two bars 5 and 6 are clamped by tightening the knurled nuts 14 and 15 on the intermediate screw 12, so that the bar 6 is forced against the rounded ends of the screws 8 and 9. By adjusting these screws on the bar 5 the spacing between the two bars 5 and 6 may be varied at will. Also, by adjusting one of the screws so that the length of the screw extending between the two bars is greater than the corresponding length of the other screw, any desired angular relation between the two bars may be established, and then the two bars rigidly clamped against the ends of the screws 8 and 9 by means of the knurled nuts 14 and 15.

In making precision checking of diameters or surfaces, it is desirable that the checking gauge be itself subject to micrometric correction, or correction by the use of precision gauge blocks, and by referring to Fig. 4 it is seen that my improved shop checking gauge may be readily checked by a micrometer for internal checking, in connection with work illustrated in Fig. 1 at A. When the device is to be used for external checking precision gauge blocks may be placed between the terminal feeler balls, so that the desired precision setting of the two arms or bars may be obtained.

Due to the relative size of the terminal feeler balls and the offset construction of the fingers of the two bars or arms, the work to be checked does not come into contacting engagement with either the fingers or the arms or bars, and only with the surfaces of the terminal feeler balls. The form of the feeler or contact elements also provides minimum sliding engagement with the work to be checked, so that the machinist or shop engineer making the required checking may feel the surfaces of the work in the most practical manner, and with the greatest sensitivity to the action.

The diameters of the fingers at the points where they join the terminal feeler balls are considerably smaller than the diameters of the balls, so that the vibrations produced by sliding the balls over any work surface will be concentrated on the fingers, instead of being diffused through a greater mass of material, and the corresponding effect upon the responsive hand of the user will be somewhat better than if heavier masses of metal were used.

In checking surfaces for determination of diameters, and in checking surfaces for determination of plane uniformity, rigidity of adjustment is very necessary, and sensitiveness of feeling contact is essential to prevent force fitting of the tool upon the work, or springing of the arms against the work. My reversible and adjustable work checking gauge will render these services over a wide range of shop jobs, and will save time, labor and losses, by accurately and quickly checking work. It can be quickly reset to a different adjustment, and will retain its adjustment indefinitely, thus eliminating the need for a special ground and hardened gauge for a fixed or a limited range of adjustments.

It is understood that the arms and terminal feeler balls will be made of high grade tool steel, properly hardened for the work required.

Should it be desired to make a fine adjustment of the spacing between the two terminal feeler balls, one of the adjustable stops may be threaded away from the bar its end engages and the other adjustable stop may be threaded against the engaged bar, which operation would have the effect of moving the two terminal balls toward each other. By reversing the adjustment of the stops the balls may be moved away from each other.

It is seen that in this operation the intermediate screw and its nuts combine to serve as means for tilting the bar 6, to move the terminal feeler balls toward or away from each other. When the limit of movement desired to fix the adjustment is obtained, then one of the adjustable stops is threaded under pressure against the tilting bar, while the other is held in its adjusted position.

I claim as new and patentable:

1. A reversible and adjustable work checking gauge, consisting of a pair of members, a pair of adjustable stops carried by one of the said members for varying the distance between the two members, a clamping member extending through the two members for clamping the same against the stops, and a finger carried by the end of each member and relieved on one side and provided with a terminal ball, said members being reversible relative to the adjustable stops and the clamping member, whereby the relieved sides of the fingers may be arranged inwardly or outwardly.

2. A reversible and adjustable work checking gauge, consisting of a pair of bars, each bar having a finger extension on one end thereof, and each finger having a terminal feeler ball, one of the fingers being relieved on one side to provide a clearance, a screw extending through both bars, one of the bars having a seat through which the screw extends, a nut threaded on the screw against the other bar, and stops adjustable on one of the bars and adapted to engage the other bar for regulating the distance between the two bars and to cooperate with the screw and its nut to clamp the bars against the stops, said screw having a ball end washer to engage the conical seat.

3. A reversible and adjustable work checking gauge, consisting of a pair of bars, each bar having a finger extending from one end thereof, each finger having an integral spherical feeler element on its outer end, each finger being relieved rearwardly of its feeler element, one of the bars having a transverse hole and conical seats formed on the walls at the opposite ends of the hole, a screw extending through said hole and seats, a conical washer on said screw adapted to engage either seat, a nut threaded on the screw against the washer, a nut threaded on the screw against the other bar, and a pair of screws threaded through one of the bars and adapted to engage the other bar, each of said screws having a rounded end for said engagement, said bar with the conical seats having rounded recesses to receive said rounded screw ends.

4. A work checking gauge, comprising two bars, each bar having a feeler element on one end thereof and having a relieved portion on one side thereof, one bar having a pair of screws threaded through the same and the other bar having sockets on opposite sides thereof to engage the ends of said screws, said other bar having a transverse opening intermediate of said sockets, a screw extending through the opening of said other bar and through the opposed portion of the companion bar, a nut threaded on said last-named screw against the outer side of said companion bar, the transverse opening of said other bar terminating in seats on the opposite sides of said other bar, a nut threaded on said last-named screw adjacent said other bar, and a washer having a ball end to engage the outermost of said seats, whereby the two bars may be clamped in various angular positions against the resistance of said screws, and the two bars may be reversed on said screws to check internal or external surfaces.

5. A reversible checking gauge, comprising a pair of bars, each bar having a work contacting terminal and one of the bars having spherical sockets on opposite sides thereof, a pair of screws threaded through one of the bars and having terminals engaging the side of the other bar, a screw extending through said last-named bar, a washer on said last screw having a ball end engaging one of said sockets, a nut threaded on the last screw to force said washer against said socket, and a nut threaded on the last screw against the other bar, said socketed bar being reversible with reference to said last named screw, and each of said work contacting terminals being offset relative to the major axis of its bar.

6. A reversible checking gauge, comprising a pair of bars, each bar having an offset work contacting terminal on one end thereof, one of the bars having a socket on one side thereof, a screw extending through both bars and passing freely through said socket, a ball ended washer on said screw engaging said socket, a nut threaded on said screw against the washer, a nut threaded on said screw against the other bar, and screws threaded through said other bar against the sides of the socketed bar to vary the angular relation thereof, said socketed bar tilting on said washer and being reversible on said first screw.

7. A checking gauge, comprising a pair of bars, each bar being provided with a ball shaped terminal for engaging the work to be gauged, a screw extending through both bars, means carried by said screw engaging one of the bars and serving as a pivot therefor to permit said bar to have a rocking movement on said screw, a nut threaded on said screw against said means and a nut threaded on said screw against the other bar, and screws threaded through said other bar on opposite sides of said screw against the opposite bar to regulate the angular relation of the two bars and to vary the distance between the work engaging ball shaped terminals.

HERBERT CHORLTON.

REFERENCES CITED

The following references are of record in the file of this patent:

UNITED STATES PATENTS

| Number | Name | Date |
|---|---|---|
| 796,612 | Spalding | Aug. 8, 1905 |
| 1,172,359 | Hess | Feb. 22, 1916 |
| 1,269,336 | Taylor | June 11, 1918 |

FOREIGN PATENTS

| Number | Country | Date |
|---|---|---|
| 136,427 | Great Britain | Dec. 18, 1919 |